(12) United States Patent  
Imura (10) Patent No.: US 12,095,128 B2
(45) Date of Patent: Sep. 17, 2024

(54) SOLID OXIDE TYPE FUEL BATTERY CELL (71) Applicant: KYOCERA Corporation, Kyoto (JP)

(72) Inventor: Kensuke Imura, Kirishima (JP)

(73) Assignee: KYOCERA Corporation, Kyoto (JP)

(*) Notice: Subject to any disclaimer, the term of this patent is extended or adjusted under 35 U.S.C. 154(b) by 211 days.

(21) Appl. No.: 16/982,885

(22) PCT Filed: Mar. 20, 2019

(86) PCT No.: PCT/JP2019/011776
§ 371 (c)(1),
(2) Date: Sep. 21, 2020

(87) PCT Pub. No.: WO2019/188685
PCT Pub. Date: Oct. 3, 2019

(65) Prior Publication Data
US 2021/0005914 A1 Jan. 7, 2021

(30) Foreign Application Priority Data
Mar. 28, 2018 (JP) .................. 2018-062278

(51) Int. Cl.
*H01M 8/1213* (2016.01)
*H01M 8/2428* (2016.01)

(52) U.S. Cl.
CPC ....... *H01M 8/1213* (2013.01); *H01M 8/2428* (2016.02)

(58) Field of Classification Search
CPC ............. H01M 8/1213; H01M 8/2428; H01M 8/1231; H01M 8/0297; H01M 2008/1293;
(Continued)

(56) References Cited

U.S. PATENT DOCUMENTS

2004/0069655 A1* 4/2004 Chaput ............... H01M 4/9033
205/765
2007/0259242 A1 11/2007 Schaevitz et al.
(Continued)

FOREIGN PATENT DOCUMENTS

CN 101496214 A 7/2009
EP 2224520 A1 9/2010
(Continued)

*Primary Examiner* — Ula C Ruddock
*Assistant Examiner* — Sarika Gupta
(74) *Attorney, Agent, or Firm* — Procopio, Cory, Hargreaves & Savitch LLP (57) ABSTRACT A solid oxide type fuel battery cell includes a substrate that has electrical insulation, a solid electrolyte that includes first parts, and residual parts different in shape from the first parts, a plurality of electricity generation elements, each electricity generation element including a fuel electrode on the substrate, one of the residual parts on the fuel electrode, and an air electrode on the one of the residual parts, a length of each electricity generation element in a longitudinal direction being defined by a length of the air electrode, and a plurality of electrical connection parts, each electrical connection part being disposed between adjacent two of the plurality of electricity generation elements, each electrical connection part including an electrical connection member that electrically connects a fuel electrode of first one of the plurality of electricity generation elements and an air electrode of second one of the plurality of electricity generation elements.

6 Claims, 6 Drawing Sheets (58) Field of Classification Search
CPC .. H01M 2300/0074; H01M 8/12; Y02E 60/50
See application file for complete search history.

(56) References Cited

U.S. PATENT DOCUMENTS

| | | | |
|---|---|---|---|
| 2010/0291459 A1* | 11/2010 | Nishihara | H01M 8/023 |
| | | | 429/465 |
| 2012/0107715 A1 | 3/2012 | Ohmori et al. | |
| 2012/0141905 A1* | 6/2012 | Okamoto | H01M 8/0245 |
| | | | 429/495 |
| 2013/0183594 A1 | 7/2013 | Niimi et al. | |
| 2017/0141426 A1* | 5/2017 | Ohmori | H01M 8/2483 |

FOREIGN PATENT DOCUMENTS

| | | |
|---|---|---|
| JP | 4850980 B1 | 1/2012 |
| JP | 2012-38586 A | 2/2012 |
| JP | 2012-38717 A | 2/2012 |
| JP | 2012-038718 A | 2/2012 |
| JP | 2013-140696 A | 7/2013 |
| JP | 2014-67698 A | 4/2014 |
| JP | 2015-69701 A | 4/2015 |
| JP | 2016-154096 A | 8/2016 |

* cited by examiner

SOLID OXIDE TYPE FUEL BATTERY CELL

CROSS-REFERENCE TO RELATED APPLICATION(S)

This application is a national stage application of International Application No. PCT/JP2019/011776 filed on Mar. 20, 2019, which designates the United States, the entire contents of which are herein incorporated by reference, and which is based upon and claims the benefit of priority to Japanese Patent Application No. 2018-062278 filed on Mar. 28, 2018, the entire contents of which are herein incorporated by reference.

FIELD

The present disclosure relates to a solid oxide type fuel battery cell.

BACKGROUND

A solid oxide type fuel battery cell (that may be referred to as a cell, below) has conventionally been known that includes "a porous support substrate that is provided with a gas flow channel in an inside thereof and does not have an electron conductivity", "a plurality of electricity generation element parts that are respectively provided at a plurality of locations that are separated from one another on a surface of the support substrate and are provided by laminating a fuel electrode, a solid electrolyte, and an air electrode", and "one or more electrical connection parts that are each provided between one set or multiple sets of adjacent electricity generation element parts and have an electrical connection member that electrically connects a fuel electrode of one of the adjacent electricity generation element parts and an air electrode of another thereof" (see, for example, Patent Literature 1). Such a configuration is also referred to as "a horizontal stripe type". A gas such as a fuel gas is introduced from an end of a gas flow channel inside such a call, so that it is possible to execute electricity generation.

CITATION LIST

Patent Literature

Patent Literature 1: Japanese Patent Application Publication No. 2012-038718

SUMMARY

A solid oxide type fuel battery cell in the present disclosure includes a support substrate that is of an insulating property, of a flat plate shape, and porous, a plurality of electricity generation element parts that are respectively arrayed at a plurality of locations that are separated from one another on at least one principal face of the support substrate and are parts where at least a fuel electrode, a solid electrolyte, and an air electrode are laminated, and a plurality of electrical connection parts that are each provided between adjacent electricity generation element parts and have an electrical connection member that electrically connects a fuel electrode of one of the electricity generation element parts and an air electrode of another of the electricity generation element parts. The solid electrolyte includes a first part that is not included in the electricity generation element parts, and a site that is included in the electricity generation element parts and the first part have parts with different shapes.

DESCRIPTION OF EMBODIMENTS

Figure 1A:
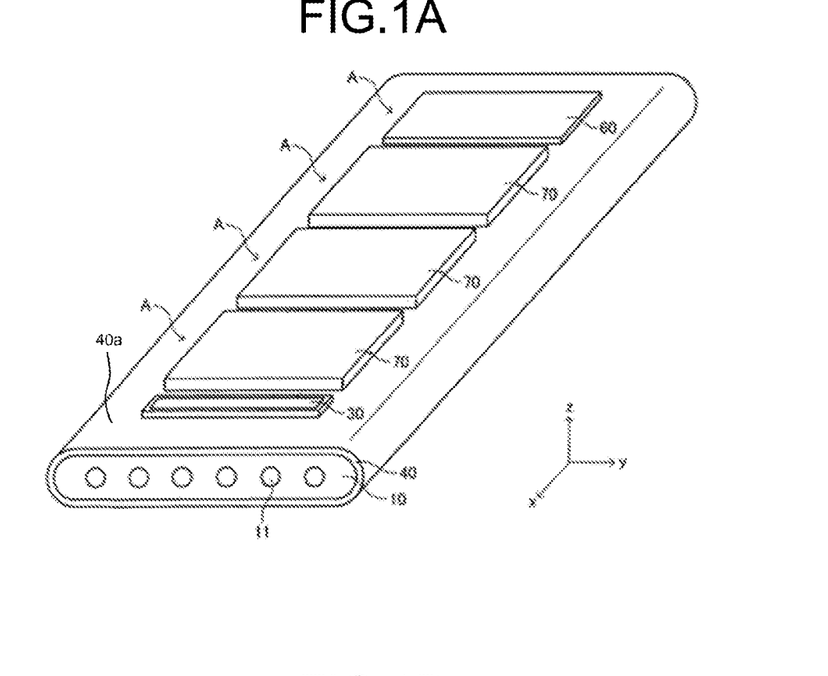
FIG. 1A is a perspective view that illustrates a solid oxide type fuel battery cell.

FIG. 1A illustrates a solid oxide type fuel battery cell according to an embodiment. Such a cell has a structure that is referred to as a so-called "horizontal stripe type" where a plurality of (four, in the present embodiment) electricity generation element parts A with identical shapes that are electrically connected in series are arrayed at a predetermined interval in a longitudinal direction thereof on each of upper and lower faces (mutually parallel principal faces (flat faces) on both sides thereof) of a support substrate 10 with a columnar shape and a flat plate shape that has a longitudinal direction thereof (a direction of an x-axis).

A shape of such a cell that is viewed from above is, for example, a rectangular shape where a length of a side thereof in a longitudinal direction thereof is 5 to 50 cm and a length thereof in a width direction thereof (a direction of a y-axis) that is orthogonal to the longitudinal direction is 1 to 10 cm. A thickness of such a cell is 1 to 5 mm. Such a cell has a vertically symmetric shape with respect to a plane that passes through a center thereof in a thickness direction thereof and is parallel to a principal face of the support substrate 10. Hereinafter, a detail of such a cell will be explained with reference to FIG. 2 that is a cross-sectional view of such a cell in a longitudinal direction of a cell as illustrated in FIG. 1A, in addition to FIG. 1A.

Figure 2:
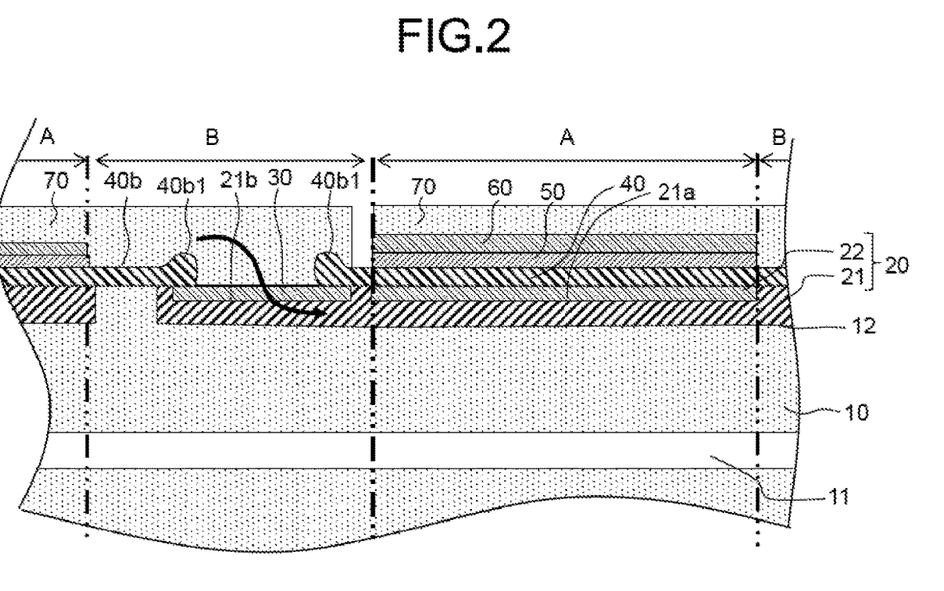
FIG. 2 is a cross-sectional view of a solid oxide type fuel battery cell as illustrated in FIG. 1A.

FIG. 2 is a part of a cross-sectional view of a solid oxide type fuel battery cell as illustrated in FIG. 1A in a longitudinal direction thereof. In other words, it is a part of a cross-sectional view that includes the support substrate 10, an electricity generation element part A, and an electrical connection part B.

The support substrate 10 is a fired body with a columnar shape and a flat plate shape that is composed of a (insulating) porous material that does not have an electron conductivity. Inside the support substrate 10, a plurality of (six, in an embodiment) gas flow channels 11 (through-holes) that extend in a longitudinal direction thereof are provided at a predetermined interval in a width direction thereof.

In an embodiment, a first recess 12 is provided at each of a plurality of locations on a principal face of the support substrate 10. Each first recess 12 is a recessed portion with a rectangular solid shape that is defined by a bottom wall that is composed of a material of the support substrate 10 and side walls that are composed of the material of the support substrate 10 over a whole circumference thereof and are closed in a circumferential direction thereof (two side walls along a longitudinal direction thereof and two side wall along a width direction thereof).

It is possible to compose the support substrate 10 so as to include "a transition metal oxide or a transition metal" and an insulating ceramic(s). For "a transition metal oxide or a transition metal", NiO (nickel oxide) or Ni (nickel) is preferable. It is possible for a transition metal to function as a catalyst that accelerates a reforming reaction of a fuel gas (a reforming catalyst for a hydrocarbon-type gas).

Furthermore, for an insulating ceramic(s), MgO (magnesium oxide) or "a mixture of $MgAl_2O_4$ (magnesia alumina spinel) and MgO (magnesium oxide)" is preferable. Furthermore, for an insulating ceramic(s), CSZ (calcia-stabilized zirconia), YSZ (8YSZ) (yttria-stabilized zirconia), or $Y_2O_3$ (yttria) may be used.

Thus, the support substrate 10 includes "a transition metal oxide or a transition metal", so that it is possible to accelerate reforming of a residual gas component before reforming. Specifically, in a process where a gas that includes a residual gas component before reforming is supplied from a gas flow channel 11 to a fuel electrode through multiple pores inside the support substrate 10 that is porous, it is possible to accelerate reforming of the residual gas component before reforming by a catalytic action as described above. In addition, the support substrate 10 includes an insulating ceramic(s), so that it is possible to ensure an insulating property of the support substrate 10. As a result, it is possible to ensure an insulating property between adjacent fuel electrodes.

A thickness of the support substrate 10 is 1 to 5 mm. Hereinafter, only a configuration of the support substrate 10 on an upper face side thereof will be explained for explanatory convenience by taking a shape of such a structural body that is vertically symmetric into consideration. The same also applies to configuration of the support substrate 10 on a lower face side thereof.

Figure 1B:
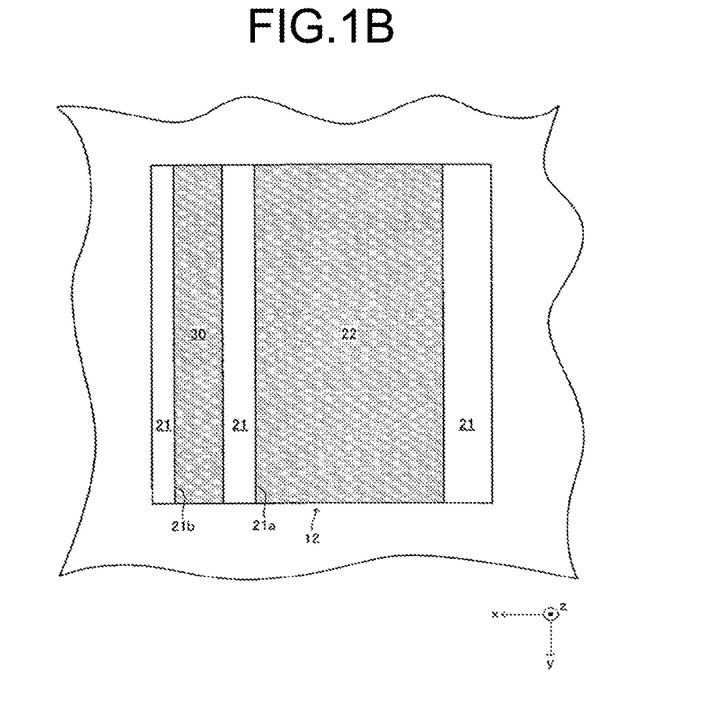
FIG. 1B is a plan view that illustrates a state where a fuel electrode and an interconnector are buried in a recess.

As illustrated in FIG. 2, a whole of a fuel electrode collector layer 21 is buried in (fills) each first recess 12 on an upper face of the support substrate 10 (a principal face thereof on an upper side thereof). Therefore, each fuel electrode collector layer 21 has a rectangular solid shape. A second recess 21a is provided on an upper face (an outer face) of each fuel electrode collector layer 21. As illustrated in FIG. 1B, each second recess 21a is a recessed portion with a rectangular solid shape that is defined by a bottom wall that is composed of a material of the fuel electrode collector layer 21 and side walls that are closed in a circumferential direction thereof (two side walls along a longitudinal direction thereof and two side walls along a width direction thereof). Among side walls that are closed in a circumferential direction thereof, two side walls along a longitudinal direction thereof (a direction of an x-axis) are composed of a material of the support substrate 10 and two side walls along a width direction thereof (a direction of a y-axis) are composed of a material of the fuel electrode collector layer 21.

A whole of a fuel electrode active part 22 is buried in (fills) each second recess 21a. Therefore, each fuel electrode active part 22 has a rectangular solid shape. A fuel electrode 20 is composed of the fuel electrode collector layer 21 and the fuel electrode active part 22. The fuel electrode 20 (the fuel electrode collector layer 21+the fuel electrode active part 22) is a fired body that is composed of a porous material that has an electron conductivity. Two side faces and a bottom face of each fuel electrode active part 22 along a width direction thereof (a direction of a y-axis) contact the fuel electrode collector layer 21 in the second recess 21a.

A third recess 21b is provided on a part that excludes the second recess 21a on an upper face (an outer face) of each fuel electrode collector layer 21. Each third recess 21b is a recessed portion with a rectangular solid shape that is defined by a bottom wall that is composed of a material of the fuel electrode collector layer 21 and side walls that are closed in a circumferential direction thereof (two side walls along a longitudinal direction thereof and two side walls along a width direction thereof). Among side walls that are closed in a circumferential direction thereof, two side walls along a longitudinal direction thereof (a direction of an x-axis) are composed of a material of the support substrate 10 and two side walls along a width direction thereof (a direction of a y-axis) are composed of a material of the fuel electrode collector layer 21.

An interconnector (a conductive compact body) 30 is buried in (fills) each third recess 21b. Therefore, each interconnector 30 has a rectangular solid shape. The interconnector 30 is a fired body that is composed of a compact material that has an electron conductivity. Two side faces and a bottom face of each interconnector 30 along a width direction thereof contact the fuel electrode collector layer 21 in the third recess 21b.

One flat face (a flat face that is identical to a principal face of the support substrate 10 in a case where the first recess 12 is not provided) is composed of an upper face (an outer face) of the fuel electrode 20 (the fuel electrode collector layer 21 and the fuel electrode active part 22), an upper face (an outer face) of the interconnector 30, and a principal face of the support substrate 10. However, a slight step may be provided among an upper face of the fuel electrode 20, an upper face of the interconnector 30, and a principal face of the support substrate 10.

It is possible to provide the fuel electrode active part 22 that is composed of, for example, NiO (nickel oxide) and YSZ (yttria-stabilized zirconia). Alternatively, it may be composed of NiO (nickel oxide) and GDC (gadolinium-doped ceria). It is possible to provide the fuel electrode collector layer 21 that is composed of, for example, NiO (nickel oxide) and YSZ (yttria-stabilized zirconia). Alternatively, it may be composed of NiO (nickel oxide) and $Y_2O_3$ (yttria) or may be composed of NiO (nickel oxide) and CSZ (calcia-stabilized zirconia). A thickness of the fuel electrode active part 22 is 5 to 30 and a thickness of the fuel electrode collector layer 21 (that is, a depth of the first recess 12) is 50 to 500 μm.

Thus, the fuel electrode collector layer 21 is composed so as to include a material that has an electron conductivity. The fuel electrode active part 22 is composed so as to include a material that has an electron conductivity and a material that has an oxidizing ion (an oxygen ion) conductivity. "A ratio of a volume of a material that has an oxidizing ion conductivity to a total volume that excludes a pore part" in the fuel electrode active part 22 is greater than "a ratio of a volume of a material that has an oxidizing ion conductivity to a total volume that excludes a pore part" in the fuel electrode collector layer 21.

It is possible to provide the interconnector 30 that is composed of, for example, $LaCrO_3$ (lanthanum chromite).

Alternatively, it may be composed of (Sr,La)TiO$_3$ (lanthanum-doped strontium titanate). A thickness of the interconnector 30 is 10 to 100 μm. Furthermore, a porosity thereof is 10% or less.

On an outer peripheral face of the support substrate 10 that extends in a longitudinal direction thereof (an array direction of electricity generation element parts A) in a state where the fuel electrode 20 is buried in each first recess 12, a whole face of each part with a plurality of interconnectors 30 being formed therein that excludes a central part thereof in a longitudinal direction thereof is covered by a solid electrolyte film 40. The solid electrolyte film 40 is a fired body that is composed of a compact material that has an ion conductivity and does not have an electron conductivity. It is possible to provide the solid electrolyte film 40 that is composed of, for example, YSZ (yttria-stabilized zirconia). Alternatively, it may be composed of LSGM (lanthanum gallate type). A thickness of the solid electrolyte film 40 is 3 to 50 μm.

That is, a whole face of an outer peripheral face of the support substrate 10 that extends in a longitudinal direction thereof in a state where the fuel electrode 20 is buried in each first recess 12 is covered by a compact layer that is composed of the interconnector 30 and the solid electrolyte film 40. Such a compact layer exerts a gas seal function to prevent mixing of a fuel gas that flows through an inner space of the compact layer and air that flows through an outer space of the compact layer.

Additionally, as illustrated in FIG. 2, in the present embodiment, the solid electrolyte film 40 covers an upper face of the fuel electrode 20 (the fuel electrode collector layer 21+the fuel electrode active part 22), both end parts of an upper face of the interconnector 30 in a longitudinal direction thereof, and a principal face of the support substrate 10.

An air electrode 60 is provided, through a reaction prevention film 50, on an upper face of the solid electrolyte film 40 at a location where it contacts each fuel electrode active part 22. The reaction prevention film 50 is a fired body that is composed of a compact material and the air electrode 60 is a fired body that is composed of a porous material that has an electron conductivity. Shapes of the reaction prevention film 50 and the air electrode 60 that are viewed from above are rectangular shapes that are substantially identical to that of the fuel electrode active part 22.

It is possible to provide the reaction prevention film 50 that is composed of, for example, GDC=(Ce,Gd)O$_2$ (gadolinium-doped ceria). A thickness of the reaction prevention film 50 is 3 to 50 It is possible to provide the air electrode 60 that is composed of, for example, LSCF=(La,Sr)(Co,Fe)O$_3$ (lanthanum strontium cobalt ferrite). Alternatively, it may be composed of LSF=(La,Sr)FeO$_3$ (lanthanum strontium ferrite), LNF=La(Ni,Fe)O$_3$ (lanthanum nickel ferrite), LSC=(La,Sr)CoO$_3$ (lanthanum strontium cobaltite), or the like. Furthermore, the air electrode 60 may be composed of two layers that are a first layer (an inner layer) that is composed of LSCF and a second layer (an outer layer) that is composed of LSC. A thickness of the air electrode 60 is 10 to 100 μm.

Additionally, a reason why the reaction prevention film 50 is interposed therebetween is to prevent or reduce occurrence of an phenomenon that YSZ in the solid electrolyte film 40 and Sr in the air electrode 60 react at a time of cell fabrication or in a cell during an operation thereof to form a reaction layer with a high electrical resistance at an interface between the solid electrolyte film 40 and the air electrode 60.

Herein, a laminated body that is provided by laminating the fuel electrode 20, the solid electrolyte film 40, and the air electrode 60 corresponds to "an electricity generation element part A" (see FIG. 2). Additionally, a laminated body (an electricity generation element part A) may include the reaction prevention film 50. That is, a plurality of (four, in the present embodiment) electricity generation element parts A are arranged on an upper face of the support substrate 10 at a predetermined interval in a longitudinal direction thereof. Additionally, a direction where the fuel electrode 20, the solid electrolyte film 40, and the air electrode 60 are laminated is referred to as a lamination direction. Furthermore, hereinafter, an air electrode side and a support substrate side may also be referred to as an upper side and a lower side, respectively.

For adjacent electricity generation element parts A, an air electrode collector layer 70 is provided on upper faces of the air electrode 60, the solid electrolyte film 40, and the interconnector 30 so as to bridge over the interconnector 30 of one of the electricity generation element parts A (on a right side in FIG. 2) and the air electrode 60 of another of the electricity generation element parts A (on a left side in FIG. 2). The air electrode collector layer 70 is a fired body that is composed of a porous material that has an electron conductivity. A shape of the air electrode collector layer 70 that is viewed from above is a rectangular shape.

It is possible to provide the air electrode collector layer 70 that is composed of, for example, LSCF=(La,Sr)(Co,Fe)O$_3$ (lanthanum strontium cobalt ferrite). Alternatively, it may be composed of LSC=(La,Sr)CoO$_3$ (lanthanum strontium cobaltite). Alternatively, it may be composed of Ag (silver) or Ag—Pd (a silver palladium alloy). A thickness of the air electrode collector layer 70 is 50 to 500 μm. Furthermore, a porosity thereof is 20 to 60%.

Each air electrode collector layer 70 is thus formed, so that adjacent electricity generation element parts A are electrically connected. Specifically, the fuel electrode 20 (in particular, the fuel electrode collector layer 21) of one of the electricity generation element parts A (on a right side, in FIG. 2) and the air electrode 60 of another of the electricity generation element parts A (on a left side, in FIG. 2) are electrically connected through "the air electrode collector layer 70 and the interconnector 30" that have electron conductivities. Hereinafter, the air electrode collector layer 70, the interconnector 30, or the fuel electrode collector layer 21 may be referred to as an electrical connection member.

As a result, a plurality of (four, in the present embodiment) electricity generation element parts A that are arranged on an upper face of the support substrate 10 are electrically connected in series. Herein, a part other than "electricity generation element parts A" that includes "the air electrode collector layer 70 and the interconnector 30" that have electron conductivities is provided as "an electrical connection part B".

While the solid electrolyte film 40 is located on the support substrate 10 other than a part where the interconnector 30 is located, a part of the solid electrolyte film 40 that is not included in an electricity generation element part A (a part where none of the fuel electrode 20 and the air electrode 60 is laminated) is provided as a first part 40a. In the present embodiment, the solid electrolyte film 40 has a part where shapes of an electricity generation element part A and the first part 40a are different, as described later. Additionally, a shape means that not only a form, per se, but also a surface property is included. Furthermore, the first part 40a is not illustrated in FIG. 2 but is illustrated in FIG. 1A.

A part of the first part 40a that is covered by an electrical connection member is referred to as a second part 40b. In an embodiment in FIG. 2, the second part 40b refers to a part that is covered by the air electrode collector layer 70. Additionally, "being covered by an electrical connection member" means a state where an electrical connection member directly contacts an upper face of the first part 40a.

The second part 40b has a terminal part 40b1 in a direction that is orthogonal to a lamination direction (that may be referred to as a horizontal direction below). The terminal part 40b1 is covered by an electrical connection member and contacts the electrical connection member in a horizontal direction. Additionally, the terminal part 40b1 does not include a boundary part between the second part 40b and the first part 40a. In an embodiment as illustrated in FIG. 2, the terminal part 40b1 is covered by the air electrode collector layer 70 and contacts the air electrode collector layer 70 in a horizontal direction.

A part that contacts an electrical connection member in a horizontal direction refers to a part where an angle between a normal line to an upper surface of the second part 40b and a line along a lower surface of the second part 40b, in a cross section in a longitudinal direction of a cell and a lamination direction (a cross section in FIG. 2), is less than 90 degrees.

In another embodiment, a terminal part may be covered by an interconnector and contact the interconnector in a horizontal direction.

Figure 5:
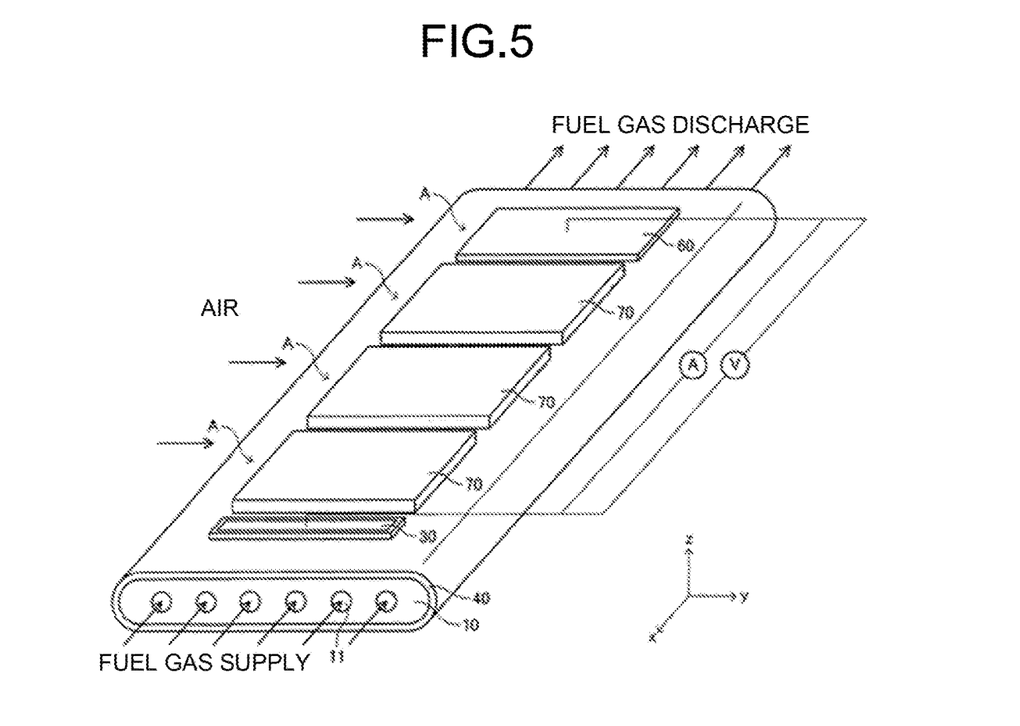
FIG. 5 is a diagram for explaining an operational state of a solid oxide type fuel battery cell as illustrated in FIG. 1A and FIG. 1B.

For a "horizontal stripe type" cell as explained above, as illustrated in FIG. 5, a fuel gas (such as hydrogen gas) flows in the gas flow channels 11 of the support substrate 10 and upper and lower faces of the support substrate 10 (in particular, respective air electrode collector layers 70) are exposed to "a gas that includes oxygen" (such as air) (or a gas that includes oxygen flows along upper and lower faces of the support substrate 10), so that an electromotive force is generated by an oxygen partial pressure difference that is caused between both side faces of the solid electrolyte film 40. Moreover, as such a structural body is connected to an external load, chemical reactions as indicated by formulas (1) and (2) as described below occur so that a current flows (an electricity generation state).

$$(\tfrac{1}{2})\cdot O_2 + 2e^- \rightarrow O^{2-} \text{ (at: the air electrode 60)} \tag{1}$$

$$H_2 + O^{2-} \rightarrow H_2O + 2e^- \text{ (at: the fuel electrode 20)} \tag{2}$$

In an electricity generation state, as illustrated in FIG. 2, a current flows between adjacent electricity generation element parts A as indicated by an arrow. As a result, an electric power is taken from a whole cell (specifically, through the interconnector 30 of an electricity generation element part A on a foremost side and the air electrode 60 of an electricity generation element part A on an innermost side, in FIG. 5). Additionally, a (non-illustrated) collector member may be provided for electrically connecting a front side and a back side of each cell in series.

Meanwhile, a difference in a thermal stress between an electricity generation element part A and the first part 40a may be caused by a difference in a coefficient of a thermal expansion or a difference of a member that contacts the solid electrolyte film 40. Accordingly, a member that contacts the solid electrolyte film 40 may be released, and accordingly, a crack may be generated.

Hence, in the present embodiment, the solid electrolyte film 40 has a part where shapes of an electricity generation element part A and the first part 40a are different. Thereby, it is possible to prevent or reduce releasing of a member that contacts the solid electrolyte film 40 at a part where a thermal stress is readily concentrated, and further, it is possible to prevent or reduce generating of a crack. Eventually, it is possible to improve a durability of a cell.

Among them, a greater amount of thermal stress may be concentrated at a part where an electrical connection member contacts the solid electrolyte film 40. In particular, a thermal stress may be concentrated near an interface between an electrical connection member and the solid electrolyte film 40 in a horizontal direction, due to an influence of a thermal expansion or contraction, and a crack that is caused by releasing therebetween may be generated at such a part. That is, a durability of a whole cell may be degraded.

Hence, in an embodiment as illustrated in FIG. 2, a thickness of the terminal part 40b1 is greater than a thickness of the second part 40b other than the terminal part 40b1.

By such a configuration, it is possible to comparatively increase a bonding surface area near an interface between an electrical connection member and the solid electrolyte film 40 in a horizontal direction (that will be referred to as a horizontal direction interface, below), so that it is possible to improve a bonding strength between the electrical connection member and the solid electrolyte film 40 near the horizontal direction interface. Hence, it is possible to prevent or reduce generation of a crack that is caused by releasing between an electrical connection member and the solid electrolyte film 40. Eventually, it is possible to improve a durability of a cell.

In an embodiment as illustrated in FIG. 2, the terminal part 40b1 has a protrusion part that protrudes toward an electrical connection member. It is sufficient that a protrusion part is provided on at least a part of the terminal part 40b1. Although a protrusion part as illustrated in FIG. 2 protrudes in a lamination direction, it may protrude in a horizontal direction.

By such a configuration, not only it is possible to improve a bonding strength between the air electrode collector layer 70 and the solid electrolyte film 40 near a horizontal direction interface, but also it is possible to prevent or reduce releasing therebetween on the horizontal direction interface by catching a protrusion part. Eventually, it is possible to improve a durability of a cell.

An arbitrary terminal part 40b1 on an arbitrary cross section in a longitudinal direction of a cell and a lamination direction (a cross section in FIG. 2) is observed, so that it is possible to confirm a thickness of the terminal part 40b1 and presence of a protrusion part. The terminal part 40b1 refers to a part from a terminal to 10% of a total length of a continuous second part in a longitudinal direction.

Furthermore, a value of an arithmetic mean roughness of an upper surface of the second part 40b may be higher than a value of an arithmetic mean roughness of an upper surface of the solid electrolyte film 40 in an electricity generation element part A.

By such a configuration, it is possible to improve a bonding strength between the second part 40b and an electrical connection member. Eventually, it is possible to improve a durability of a cell.

Moreover, a value of an arithmetic mean roughness of a surface of the terminal part 40b1 that contacts an electrical connection member may be higher than a value of an arithmetic mean roughness of an upper surface of the second part 40b other than the terminal part 40b1. A surface roughness of a part of the terminal part 40b1 that contacts an electrical connection member in a horizontal direction may be greater than a roughness of an upper surface of the second part 40b other than the terminal part 40b1.

By such a configuration, it is possible to improve a bonding strength between an electrical connection member and the solid electrolyte film 40 near a horizontal direction interface, so that it is possible to prevent or reduce generation of a crack that is caused by releasing therebetween. Eventually, it is possible to improve a durability of a cell.

It is possible to calculate a value of an arithmetic mean roughness of each part of the solid electrolyte film 40 by measuring a value of an arithmetic mean roughness of a two-dimensional surface of each arbitrary part of the solid electrolyte film 40 in an arbitrary cross section in a longitudinal direction of a cell and a lamination direction (a cross section in FIG. 2). For example, in a case where a value of an arithmetic mean roughness of a surface of the terminal part 40b1 is measured, it is possible to execute calculation thereof by measuring a value of an arithmetic mean roughness of an interface between the terminal part 40b1 and an electrical connection member in a cross section in a longitudinal direction of a cell and a lamination direction. The terminal part 40b1 refers to a part from a terminal to 10% of a total length of a continuous second part in a longitudinal direction.

Figure 6:
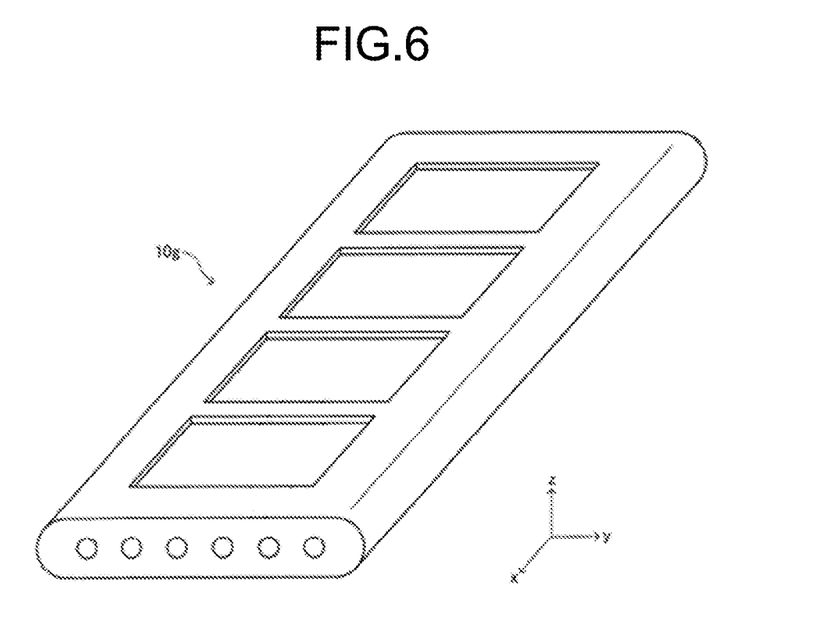
FIG. 6 is a perspective view that illustrates a support substrate in FIG. 1A and FIG. 1B.
Figure 7A:
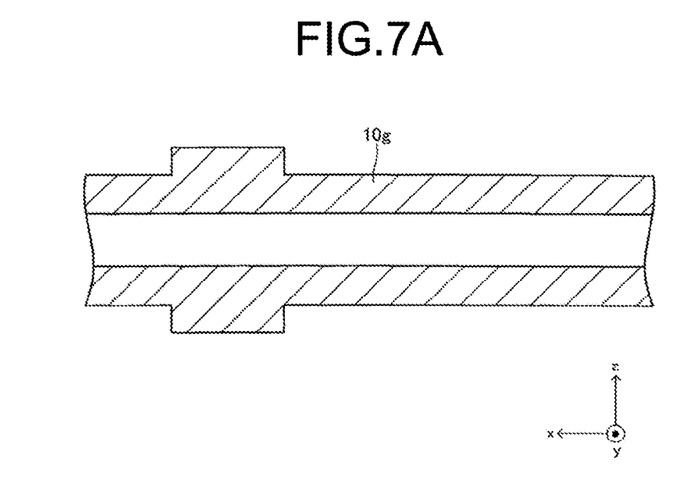
FIG. 7A is a cross-sectional view of FIG. 6.
Figure 7B:
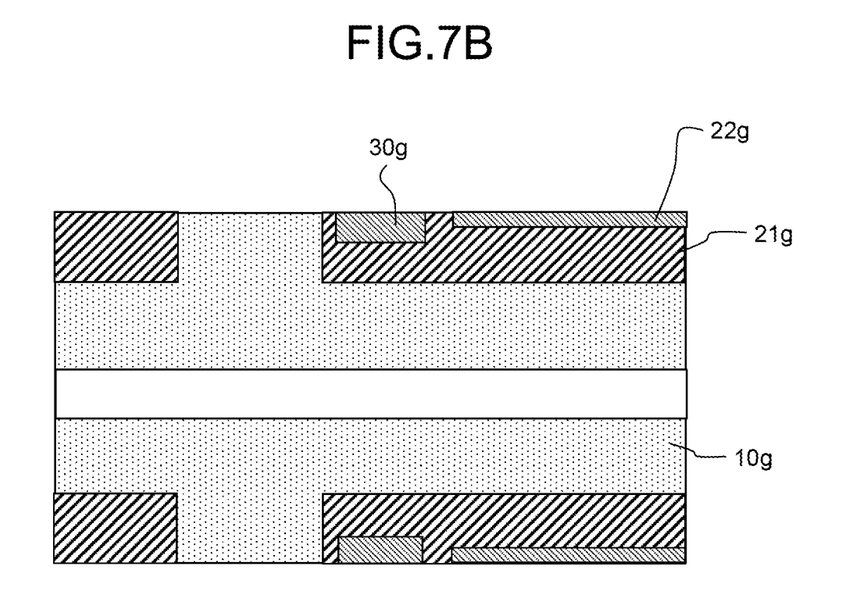
FIG. 7B is a cross-sectional view that illustrates a state where each layer is formed in a first recess.

Next, an example of a manufacturing method for a "horizontal stripe type" cell as illustrated in FIG. 1A and FIG. 1B will simply be explained with reference to FIG. 6 to FIG. 7B. In FIG. 6 to FIG. 7B, "g" at an end of a sign for each member indicates that such a member is "before firing".

First, a molded body for a support substrate 10g that has a shape as illustrated in FIG. 6 is fabricated. It is possible to fabricate such a molded body for a support substrate 10g by, for example, using a slurry that is obtained by adding a binder or the like to a powder of a material of the support substrate 10 (for example, NiO+MgO) and utilizing a technique such as extrusion molding or cutting.

Then, as illustrated in FIG. 7B, a molded body for a fuel electrode collector layer 21g is buried and formed in each of respective first recesses 12 that are formed on upper and lower faces of the molded body for a support substrate 10g. Then, a molded body for a fuel electrode active part 22g is buried and formed in each of respective second recesses 21a that are formed on outer faces of each molded body for a fuel electrode collector layer 21g. Furthermore, each molded body for a fuel electrode collector layer 21g and each fuel electrode active part 22g are buried and formed by, for example, using a slurry that is obtained by adding a binder or the like to a powder of a material of the fuel electrode 20 (for example, Ni and YSZ) and utilizing a printing method or the like.

Subsequently, a molded body for an interconnector 30g is buried and formed in each of respective third recesses 21b that are formed on "parts that exclude a part where the molded body for a fuel electrode active part 22g is buried" on outer faces of each molded body for a fuel electrode collector layer 21g. Each molded body for an interconnector 30g is buried and formed by, for example, using a slurry that is obtained by adding a binder or the like to a powder of a material of the interconnector 30 (for example, $LaCrO_3$) and utilizing a printing method or the like.

Then, a molded film for a solid electrolyte film is formed on a whole face of an outer peripheral face of the molded body for a support substrate 10g that extends in a longitudinal direction thereof in a state where each of a plurality of molded bodies for a fuel electrode (21g+22g) and a plurality of molded bodies for an interconnector 30g is buried and formed, and excludes central parts of respective parts where the plurality of molded bodies for an interconnector 30g are formed in a longitudinal direction thereof. A molded film for a solid electrolyte film is formed by, for example, using a slurry that is obtained by adding a binder or the like to a powder of a material of the solid electrolyte film 40 (for example, YSZ) and utilizing a printing method, a dipping method, or the like.

When a slurry of a sold electrolyte is laminated on the molded body for a support substrate 10g, it is possible to adjust a thickness of the terminal part 40b1 as described above at a time, and further, it is possible to provide a protrusion part by applying the slurry of a solid electrolyte on a part of the terminal part 40b1. Furthermore, a surface roughness of a slurry of a solid electrolyte on the second part 40b or the terminal part 40b1 is adjusted, so that it is possible to adjust a surface roughness of the solid electrolyte 40 on the second part 40b or the terminal part 40b1.

Then, a molded film for a reaction prevention film is formed on an outer face of a molded body for a solid electrolyte film at a location where it contacts each molded body for a fuel electrode. Each molded film for a reaction prevention film is formed by, for example, using a slurry that is obtained by adding a binder or the like to a powder of a material of the reaction prevention film 50 (for example, GDC) and utilizing a printing method or the like.

Then, the molded body for a support substrate 10g in a state where a variety of molded films are thus formed is fired, for example, in air at 1500° C. for 3 hours. Thereby, a structural body is obtained in a state where none of the air electrode 60 and the air electrode collector layer 70 is provided in a cell as illustrated in FIG. 1A and FIG. 1B.

Then, a molded film for an air electrode is formed on an outer face of each reaction prevention film 50. Each molded film for an air electrode is formed by, for example, using a slurry that is obtained by adding a binder or the like to a powder of a material of the air electrode 60 (for example, LSCF) and utilizing a printing method or the like.

Then, for each set of adjacent electricity generation element parts, a molded film for an air electrode collector layer is formed on outer faces of a molded film for an air electrode, the solid electrolyte film 40, and the interconnector 30 so as to bridge over the interconnector 30 of one of the electricity generation element parts A and a molded film for an air electrode of another of the electricity generation element parts A.

Each molded film for an air electrode collector layer is formed by, for example, using a slurry that is obtained by adding a binder or the like to a powder of a material of the air electrode collector layer 70 (for example, LSCF) and utilizing a printing method or the like.

Then, the support substrate 10 in a state where molded films are thus formed is fired, for example, in air at 1050° C. for 3 hours. Thereby, a cell as illustrated in FIG. 1A and FIG. 1B is obtained.

Figure 3A:
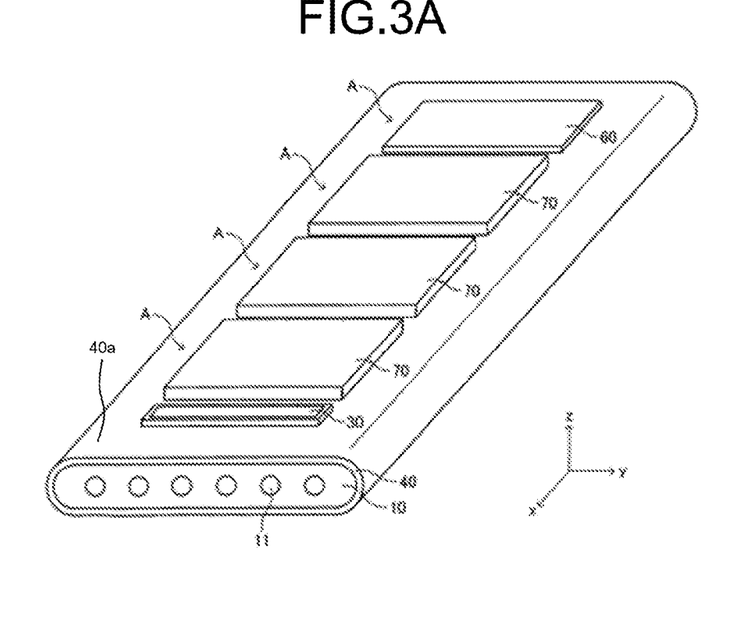
FIG. 3A is a perspective view that illustrates a solid oxide type fuel battery cell in another embodiment.
Figure 3B:
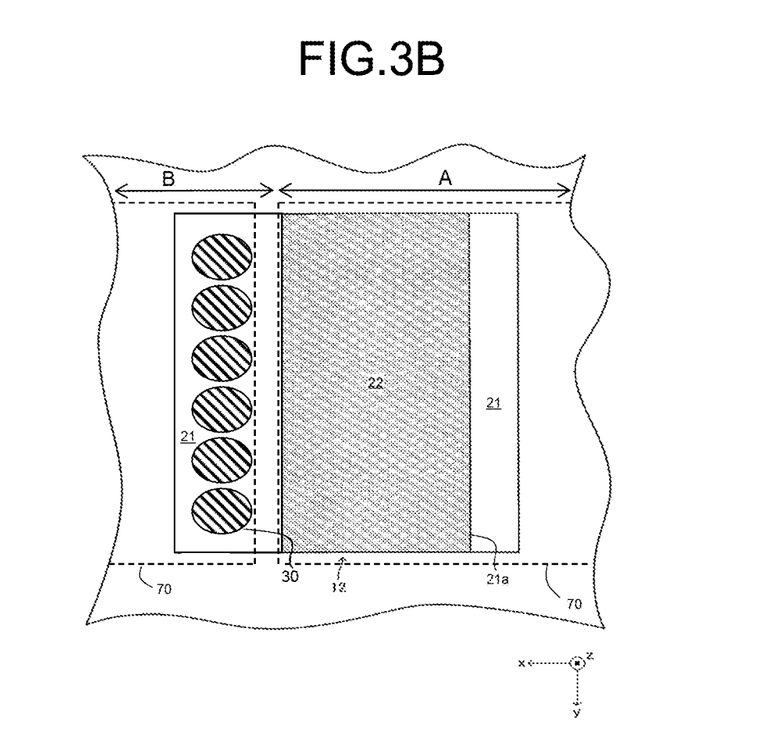
FIG. 3B is a plan view that illustrates a pair of an electricity generation element part A and an electrical connection part B in another embodiment.
Figure 4:
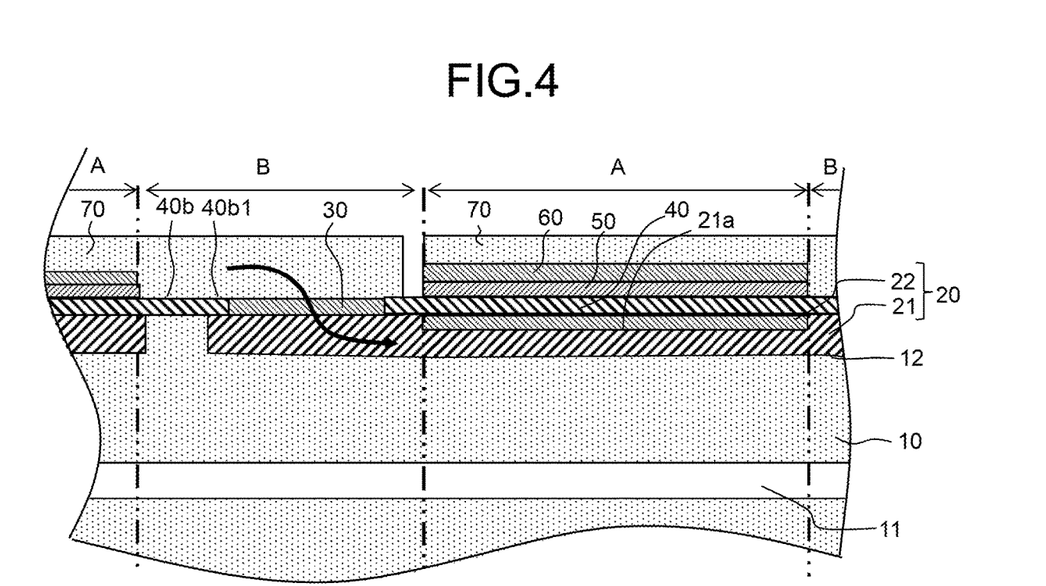
FIG. 4 is a cross-sectional view of a solid oxide type fuel battery cell as illustrated in FIG. 3A.

An embodiment as illustrated in FIG. 3A, FIG. 3B, and FIG. 4 will be explained below. An explanation of a component that is similar to that of the embodiment as described above will be omitted.

FIG. 3A illustrates a solid oxide type fuel battery cell according to the present embodiment. Furthermore, FIG. 4 is a part of a cross-sectional view of a solid oxide type fuel battery cell as illustrated in FIG. 3A in a longitudinal direction thereof.

As illustrated in FIG. 4, an interconnector 30 is located on an upper face of a fuel electrode collector layer 21 and is not located in an recess of the fuel electrode collector layer 21. It is provided in such a manner that positions of an upper face and a lower face of the interconnector 30 and positions of an upper face and a lower face of a solid electrolyte film 40 are identical positions. In other words, thicknesses of the solid electrolyte film 40 and the interconnector 30 are comparable.

Furthermore, a terminal part 40b1 of a second part 40b of the solid electrolyte film 40 contacts the interconnector 30 in a horizontal direction. Furthermore, in another embodiment, a terminal part may be covered by an interconnector.

FIG. 3B is a plan view of a pair of an electricity generation element part A and an electrical connection part B. Additionally, the solid electrolyte film 40 and an air electrode collector layer 70 are illustrated so as to be transparent.

In the present embodiment, a plurality of interconnectors 30 are provided and shapes thereof are circular shapes in a plan view. Furthermore, the solid electrolyte film 40 that is illustrated so as to be transparent in FIG. 3B is provided over a whole area where an interconnector 30 is not provided. That is, the terminal part 40b1 of the second part 40b of the solid electrolyte film 40 is of a shape that matches a shape of the interconnector 30 and a whole circumference of the terminal part 40b1 contacts the interconnector 30. In other words, the interconnector 30 that is an electrical connection member is located inside the terminal part 40b1 with a circular shape (a part that is surrounded by the terminal part 40b1 with a circular shape) and an inner peripheral wall of the terminal part 40b1 with a circular shape is connected to the interconnector 30. "An inner peripheral wall of a terminal part" refers to a part where an angle between a normal line to an upper surface of the terminal part 40b1 and a line along a lower surface of a second part in a cross section in a longitudinal direction of a cell and a lamination direction (a cross section in FIG. 2) is less than 90 degrees.

By such a configuration, it is possible to distribute a thermal stress that is generated near an interface between the solid electrolyte film 40 and an electrical connection member in a horizontal direction, so that it is possible to prevent or reduce generating of a crack in such a part. Eventually, it is possible to improve a durability of a cell.

Additionally, in another embodiment, a terminal part may be covered by an air electrode collector layer and contact the air electrode collector layer in a direction that is orthogonal to a lamination direction and an inner peripheral wall of a terminal part with a circular shape may be connected to an air electrode collector layer.

Next, a manufacturing method for a "horizontal stripe type" cell as illustrated in FIG. 3A and FIG. 4 will be explained. A point that is different from an embodiment as illustrated in FIG. 1A, FIG. 1B, and FIG. 2 will be explained.

A fabrication method for an interconnector 30 and a solid electrolyte film 40 will be explained below. A molded body for a fuel electrode collector layer 21g is buried and formed in each of respective first recesses 12 that are provided on upper and lower faces of a molded body for a support substrate 10g. Then, a molded body for a fuel electrode active part 22g is buried and formed in each of respective second recesses 21a that are formed on outer faces of each molded body for a fuel electrode collector layer 21g. Furthermore, each molded body for a fuel electrode collector layer 21g and each fuel electrode active part 22g are buried and formed by, for example, using a slurry that is obtained by adding a binder or the like to a powder of a material of a fuel electrode 20 (for example, Ni and YSZ) and utilizing a printing method or the like. Additionally, a third recess 21b is not provided, unlike the previous embodiment.

Then, a molded film for a solid electrolyte film is formed on an outer peripheral face of the molded body for a support substrate 10g that extends in a longitudinal direction thereof in a state where a plurality of molded bodies for a fuel electrode (21g+22g) are buried and formed. For a molded film for a solid electrolyte film, it is possible to use, for example, a tape that is obtained by adding a binder or the like to a powder of a material of a solid electrolyte film 40 (for example, YSZ). For fabricating such a tape, a via hole is fabricated on such a tape, printing is executed in such a manner that a molded body for an interconnector 30g is poured into such a via hole, and drying is executed. For each molded body for an interconnector 30g, it is possible to use, for example, a slurry that is obtained by adding a binder or the like to a powder of a material of the interconnector 30 (for example, LaCrO$_3$). By such a method, it is possible to laminate, on a support substrate 10, a tape of a solid electrolyte with a via hole that is filled with the interconnector 30.

The present disclosure is not limited to the embodiments as described above and it is possible to employ a variety of modifications within a scope of the present disclosure.

Furthermore, although the plurality of first recesses 12 are formed on each of upper and lower faces of the support substrate 10 with a flat plate shape and the plurality of electricity generation element parts A are provided thereon in the embodiments as described above, the plurality of first recesses 12 may be formed on only one face of the support substrate 10 and the plurality of electricity generation element parts A may be provided thereon.

Furthermore, although the fuel electrode 20 is composed of two layers that are the fuel electrode collector layer 21 and the fuel electrode active part 22 in the embodiments as described above, the fuel electrode 20 may be composed of one layer that corresponds to the fuel electrode active part 22.

REFERENCE SIGNS LIST

A . . . electricity generation element part
B . . . electrical connection part
10 . . . support substrate
11 . . . gas flow channel
20 . . . fuel electrode
22 . . . fuel electrode active layer
21 . . . fuel electrode collector layer
30 . . . interconnector
40 . . . solid electrolyte film
40a . . . first part
40b . . . second part
40b1 . . . terminal part
60 . . . air electrode
70 . . . air electrode collector layer

The invention claimed is:

1. An electrochemical cell, comprising:
a substrate that has electrical insulation;
a first element for generating electricity, the first element including:
   a first fuel electrode on the substrate;
   a first electrolyte on the first fuel electrode; and
   a first air electrode on the first electrolyte; and
a second element for generating electricity, the second element including:
   a second fuel electrode on the substrate;
   a second electrolyte on the second fuel electrode; and a second air electrode on the second electrolyte; and
a connection part disposed between the first element and the second element, the connection part including an electrical connection member that electrically connects the first fuel electrode and the second air electrode, and a third electrolyte connected to at least one of the first electrolyte and the second electrolyte and having a shape different from shapes of the first and second electrolyte, wherein
the third electrolyte includes an electrolyte part covered by the electrical connection member,
the electrolyte part includes:
    a terminal part in a direction that is orthogonal to a lamination direction; and
    a part other than the terminal part, and
a thickness of the terminal part is greater than a thickness of the part other than the terminal part,
the terminal part having a protrusion part that protrudes in the lamination direction, and
the first fuel electrode and the second fuel electrode are recessed in the substrate and the third electrolyte is flat between either the first element and the connection part, or the second element and the connection part.

2. The electrochemical cell according to claim 1, wherein the terminal part protrudes toward the electrical connection member.

3. An electrochemical cell, comprising:
a substrate that has electrical insulation;
a first element for generating electricity, the first element including:
    a first fuel electrode on the substrate;
    a first electrolyte on the first fuel electrode; and
    a first air electrode on the first electrolyte; and
a second element for generating electricity, the second element including:
    a second fuel electrode on the substrate;
    a second electrolyte on the second fuel electrode; and
    a second air electrode on the second electrolyte; and
a connection part disposed between the first element and the second element, the connection part including an electrical connection member that electrically connects the first fuel electrode and the second air electrode, and a third electrolyte connected to at least one of the first electrolyte and the second electrolyte and having a shape different from shapes of the first and second electrolyte, wherein
the third electrolyte includes electrolyte parts covered by the electrical connection member,
the electrolyte parts include:
    terminal parts provided on a common surface of the connection part in a direction that is orthogonal to a lamination direction,
an arithmetic mean roughness of an upper surface of the electrolyte part is greater than an arithmetic mean roughness of an upper surface of one of the first electrolyte and the second electrolyte, and
the first fuel electrode and the second fuel electrode are recessed in the substrate and the third electrolyte is flat between either the first element and the connection part, or the second element and the connection part.

4. The electrochemical cell according to claim 3, wherein each of the electrolyte parts include:
a terminal part in a direction that is orthogonal to a lamination direction; and
a part other than the terminal part, and
an arithmetic mean roughness of a surface of the terminal part that contacts the electrical connection member is greater than an arithmetic mean roughness of an upper surface of the part other than the terminal part.

5. An electrochemical cell, comprising:
a substrate that has electrical insulation;
a first element for generating electricity, the first element including:
    a first fuel electrode on the substrate;
    a first electrolyte on the first fuel electrode; and
    a first air electrode on the first electrolyte; and
a second element for generating electricity, the second element including:
    a second fuel electrode on the substrate;
    a second electrolyte on the second fuel electrode; and
    a second air electrode on the second electrolyte; and
a connection part disposed between the first element and the second element, the connection part including an electrical connection member that electrically connects the first fuel electrode and the second air electrode, and a third electrolyte connected to at least one of the first electrolyte and the second electrolyte and having a shape different from shapes of the first and second electrolyte, wherein
the third electrolyte includes an electrolyte part covered by the electrical connection member,
the electrolyte part includes a plurality of terminal parts including protrusion parts that protrude in a lamination direction and include round shapes in a plan view, and
the first fuel electrode and the second fuel electrode are recessed in the substrate and the third electrolyte is flat between either the first element and the connection part, or the second element and the connection part.

6. The electrochemical cell according to claim 5, wherein the plurality of terminal parts includes a first terminal and a second terminal on a line extending in a longitudinal direction; and
the electrical connection member includes a common surface that contacts the first terminal and the second terminal in a direction that is orthogonal to the lamination direction.

* * * * *